United States Patent [19]

Wiggins

[11] Patent Number: 4,508,941
[45] Date of Patent: Apr. 2, 1985

[54] VOICE COIL CENTERING AND SUSPENSION FOR VENTED POLE PIECE

[75] Inventor: John T. Wiggins, Philadelphia, Pa.

[73] Assignee: Community Light & Sound Inc., Chester, Pa.

[21] Appl. No.: 437,258

[22] Filed: Oct. 28, 1982

[30] Foreign Application Priority Data

Nov. 27, 1981 [DE] Fed. Rep. of Germany ....... 3147145

[51] Int. Cl.³ ............................................. H04M 2/02
[52] U.S. Cl. ................. 179/115.5 PC; 179/115.5 VC
[58] Field of Search ............ 179/115.5 VC, 115.5 PC, 179/115.5 R, 119 R, 180

[56] References Cited

U.S. PATENT DOCUMENTS

| | | | |
|---|---|---|---|
| 287,896 | 11/1883 | Bartlett et al. | 179/115 R |
| 1,909,275 | 5/1933 | Holland | 179/115.5 VC |
| 1,990,858 | 2/1935 | Dijksterhuis | 179/115.5 VC |
| 1,991,526 | 2/1935 | Tichenor et al. | 179/115.5 R |
| 2,047,361 | 7/1936 | Dijksterhuis | 179/115.5 R |
| 2,071,828 | 2/1937 | Glen | 179/115 R |
| 2,085,721 | 6/1937 | Warnke | 179/115.5 R |
| 2,091,011 | 8/1937 | Phelps et al. | 179/115.5 R |
| 2,123,640 | 7/1938 | Warnke | 179/115.5 R |
| 2,178,030 | 10/1939 | Bowley | 179/115.5 R |
| 2,278,598 | 4/1942 | Turney | 179/115.5 R |
| 2,347,799 | 5/1944 | Schaaf | 179/115.5 R |
| 3,033,945 | 5/1962 | Villchur | 179/115.5 VC |
| 3,496,307 | 2/1970 | Sotome | 179/115.5 R |
| 3,581,015 | 5/1971 | Masuda | 179/115.5 R |
| 3,796,839 | 3/1974 | Torn | 179/115.5 R |
| 4,239,943 | 12/1980 | Czerwinski | 179/115.5 VC |
| 4,313,040 | 1/1982 | Tsukamoto | 179/115.5 VC |

FOREIGN PATENT DOCUMENTS

| | | | |
|---|---|---|---|
| 1020677 | 12/1957 | Fed. Rep. of Germany | 179/115.5 VC |
| 579614 | 6/1923 | France | 179/115.5 VC |

Primary Examiner—Gene Z. Rubinson
Assistant Examiner—L. C. Schroeder
Attorney, Agent, or Firm—Harvey D. Fried

[57] ABSTRACT

An apparatus and method for centering a voice coil in a loudspeaker having a vented pole piece. The voice coil centering is accomplished by means of a concentrically located voice coil suspension and an attached cylindrical mounting ring that can be set into a recess, or otherwise positively located on the pole piece. The pole piece is formed in such a way so as to precisely receive a suspension mounting ring and center the voice coil in the magnetic field gap with no further adjustments. This invention permits the use of a pole piece mounted voice coil suspension on a ventilated pole piece.

23 Claims, 10 Drawing Figures

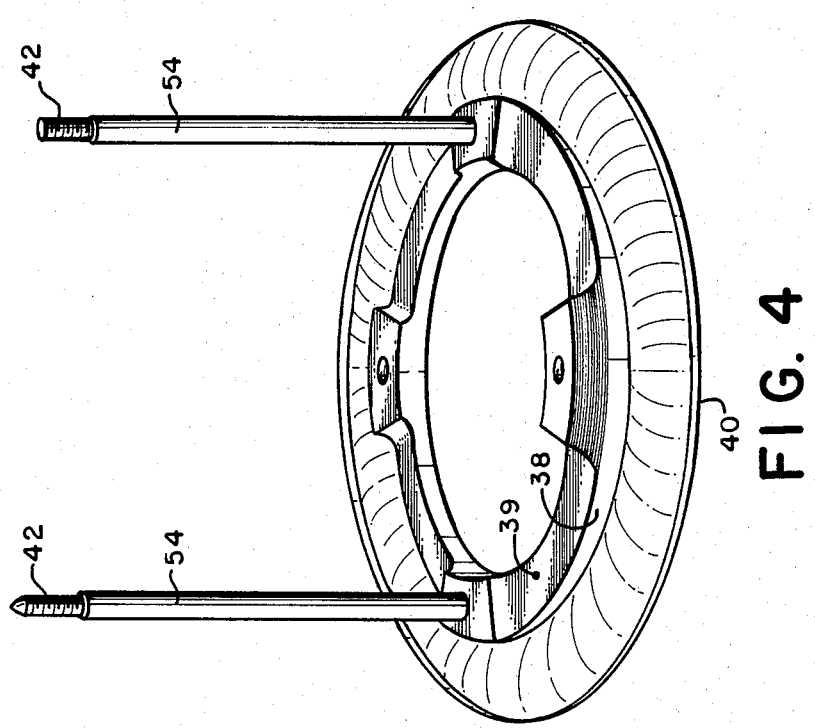

VOICE COIL CENTERING AND SUSPENSION FOR VENTED POLE PIECE

BACKGROUND OF THE INVENTION

1. Field of Invention

The invention relates to the field of loudspeakers in general, and in particular to high power electro-magnetic loudspeakers having vented pole pieces.

2. Description of Prior Art

A typical loudspeaker, such as that shown in FIG. 1, includes a paper, metal, or plastic diaphragm that is driven by an attached coil located in a magnetic field. The coil, commonly referred to as the voice coil, is of a cylindrical shape, is typically wound on a voice coil former and is centered in a circular magnetic field gap by means of one or two circumferential or concentric flexible suspensions, commonly referred to as the voice coil suspension. The voice coil suspension provides for attachment of the diaphragm and the voice coil former at the junction of the diaphragm and voice coil former with the top plate, solid (unvented) pole piece or frame of the loudspeaker. Alternating electrical current, when applied to the voice coil, will cause the diaphragm to vibrate, and therefore radiate acoustical energy into the air. The primary purpose of the voice coil suspension is to precisely center the voice coil in the magnetic field in two axes, so as to allow fore and aft excursions while preventing the voice coil from contacting the pole piece or the top plate. Conventional practice in loudspeaker design is to locate the voice coil suspension on the outside of the voice coil former and to have the circumference of the voice coil suspension fixed to the loudspeaker frame or magnetic circuit top plate. Another common method of voice coil suspension is to mount the voice coil suspension on the inside of the voice coil former by means of an axial bolt or screw in the pole pice. The centering methods cited in U.S. Pat. Nos. 287,896, 1,909,275, 1,991,526, 2,047,361, 2,085,721, 2,091,011, 2,123,640, 2,178,030, and 2,278,598 differ from the present invention because they do not permit an axial vent in the pole piece, as illustrated in FIG. 2.

A large air passage vent in the pole piece of the magnetic circuit is necessary for two reasons. Firstly, it relieves air pressurization in the area defined by the diaphragm, voice coil former, and pole piece under long diaphragm excursions which, if not vented during operation, will cause nonlinear acoustical distortion. Secondly, a large vent in the pole piece, on the order of one-third to one-half the diameter of the pole piece, is required for dissipating the heat generated in the voice coil under high power operation of the loudspeaker. A large vented pole piece will increase the heat dissipation capability of the loudspeaker by one-half, thereby reducing the possibility of voice coil warpage and greatly increasing the reliability of the loudspeaker. The method described in U.S. Pat. No. 2,347,799 is designed to limit the excursion of the loudspeaker and requires an additional conventional voice coil suspension to center the voice coil. U.S. Pat. No. 4,239,943 (FIG. 8) teaches an apparatus that could be used with a vented pole piece. It employs multiple lower suspensions to reduce eccentric motion of the voice coil where more direct methods of control are not possible. The system described in U.S. Pat. No. 4,239,943 cannot be used with a continuous integrally formed diaphragm as in the present invention.

U.S. Pat. No. 3,033,945 teaches a suspension that is located in the gap between the top plate and the circumference of the voice coil. Such a centering method is useful only for home entertainment loudspeakers with minimal acoustic output capability. Loudspeakers designed for high acoustic output require long diaphragm excursions which would be mechanically restrained by this type voice coil suspension. U.S. Pat. No. 3,496,307 teaches an elastic connection between the pole piece and the diaphragm. The material is selected to limit over-excursion at low frequencies and to also suppress unwanted resonances within the diaphragm. However, the major forces of suspending and centering the diaphragm are carried by an ordinary circumferential suspension attached to the diaphragm's outer edge.

SUMMARY OF THE INVENTION

It is an object of the present invention to provide a precise, direct mechanical means for positively and consistently centering a voice coil concentrically, that is, located within the area defined by the voice coil and former, onto a vented pole piece.

It is also an object of the present invention to allow for the diaphragm and voice coil assembly to be conveniently removed and replaced or refitted without further adjustments.

BRIEF DESCRIPTION OF THE DRAWINGS

For the purpose of illustrating the invention there are shown in the drawings forms which are presently preferred, it being understood, however, that this invention is not limited to the precise arrangements and instrumentalities shown.

FIG. 4 is a bottom perspective view of the voice coil suspension and mounting ring of FIG. 3 with its large axial vent;

DETAILED DESCRIPTION OF THE PREFERRED EMBODIMENT

Figure 1:
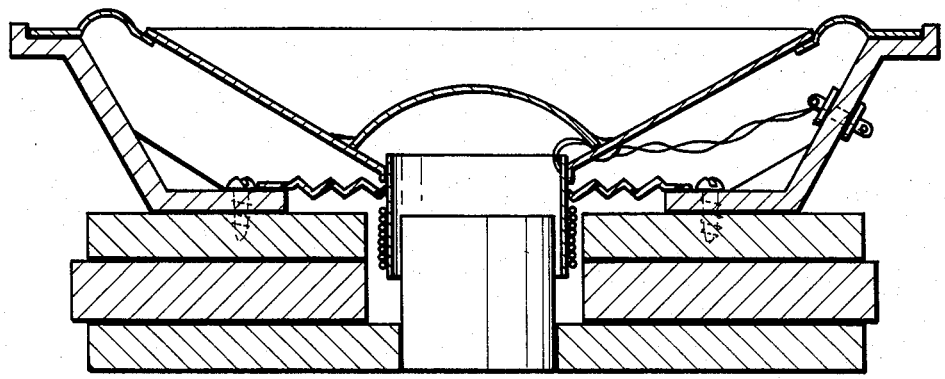
FIG. 1 is a section view of a conventional loudspeaker having a circumferential voice coil suspension.
Figure 2:
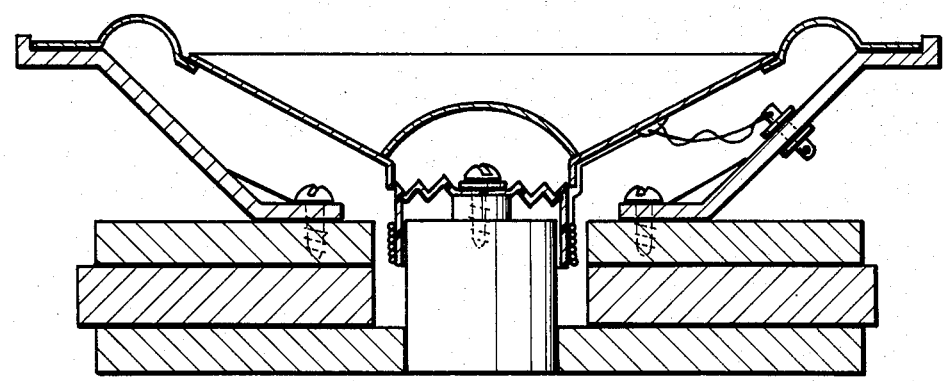
FIG. 2 is a partial section view of a conventional loudspeaker having a concentric voice coil suspension with an axial fastener.
Figure 3:
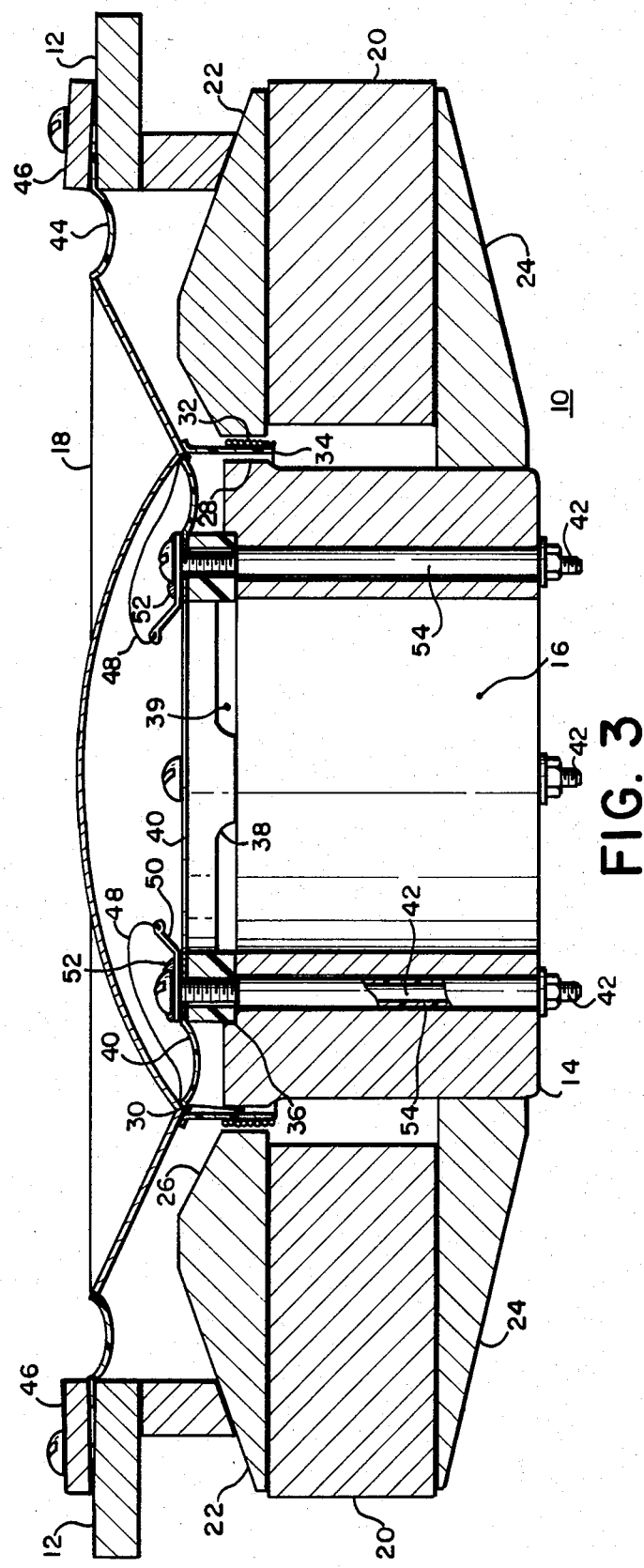
FIG. 3 is a section view of a loudspeaker constructed in accordance with this invention.

A loudspeaker according to this invention is shown in section in FIG. 3. Most of the components of the loudspeaker 10 are axially symmetrical. In order to simplify the drawing in a manner which emphasizes the novel aspects of this invention, the section view of FIG. 3 has been drawn as though a slice. This is a convention adopted in depicting many loudspeakers.

The loudspeaker 10 is held by a loudspeaker main frame 12. A center pole piece 14 forms the center of the magnetic circuit or structure. The center pole piece 14 is cylindrical and is provided with a relatively wide axial bore 16, which forms a vent for the diaphragm 18 and voice coil. The remainder of the magnetic circuit includes a ring shaped magnet 20 as well as tapered top and bottom plates 22 and 24 respectively. The ring 20 is made from magnetic material, whereas pole piece 14 and the top and bottom plates 22 and 24 must at least be a magnetically conductive material. Steel and iron are commonly used. The inner circumference of top plate 22 has a tapered portion 26. The upper portion of the outer circumference of center pole piece 14 has an outwardly extending rim or lip 28. The opposing faces of tapered portion 26 and lip 28 define an annular air gap 30 forming a region in which the magnetic field is very high, and in which the voice coil 32 of the diaphragm 18 is disposed. The voice coil 32 is wound or disposed around a voice coil former 34. The upper portion of the inner circumference of the pole piece 14 is formed with a circular recess 36. The circular recess 36 is carefully formed so that its center corresponds precisely to the longitudinal axis of the pole piece 14, and consequently the axial vent 16. A mounting ring 38, also shown in FIG. 4, is precisely dimensioned to fit in, and be centered by recess 36. An inner suspension 40 for the diaphragm 18 is formed by an annular lower suspension 40, formed from a strong, flexible material with a stable, controlled spring rate. Suitable materials include mylar (registered trademark), reinforced plastics resins, aluminum, beryllium/copper alloy and others. The construction of such suspensions, in and of themselves, is conventional. The lower suspension 40 is fixed to the mounting ring 38 so that its center is axially aligned with the center of the mounting ring. A suitable fixture can be constructed for achieving this alignment. The inner portion of the lower suspension 40 and the mounting ring 38 may be attached to one another by means of adhesives, bolts, rivets or any other suitable fastening means. The mounting ring and the lower suspension may also be integrally formed. In the presently preferred embodiment, adhesive bonding is preferred. Adhesive bonding is also the presently preferred means for securing the voice coil former 34 to the diaphragm 18 and the diaphragm 18 to the lower suspension 40. The assembly comprising the mounting ring 38 and lower suspension 40 may be attached to the pole piece 14 by suitable attachment means, such as bolts 42, other suitable fasteners or adhesive bonding. The bores in pole piece 14 through which the bolts 42 are passed may be somewhat oversized, as centering is accomplished by means of recess 36.

Diaphragm 18 is also provided with an upper suspension 44, having a flat outer portion which can be clamped between the main frame 12 and a clamping ring 46. Inasmuch as all centering is accomplished by means of the interaction between the mounting ring 38 and the recess 36 of the pole piece 14, it is unnecessary to provide the upper suspension 44, the main frame 12 or the clamping ring 46 with alignment means of any kind.

Two of the four bolts 46, which are preferably formed from brass, serve a second function in addition to securing the mounting ring 38 to the pole piece 14, namely carrying electrical current to and from the voice coil 32. The voice coil 32 is provided with leads 48 which run through a hole at the top of the voice coil former and across the lower concentric voice coil suspension 40 and are connected to the brass bolts by electrical contact lugs 50. Electrical contact lugs 50 are connected to the brass screws by an electrically conductive attachment, for example solder 52. The two bolts which carry current to and from the voice coil are provided with insulating tubular jackets 54, which may be rubber or other suitable electrical insulating material.

The tapered nature of the members constituting the magentic circuit or structure provides a more efficient magnetic circuit than flat top and bottom plates would provide. As a result, however, the loudspeaker has less space available under the diaphragm for a conventional, circumferential voice coil suspension, unless an extraordinarily long voice coil former is added to space the diaphragm away from the magnetic stucture. In the embodiment shown in FIG. 3 the mounting ring 38 is formed from a hard stable material, such as injection molded phenolic. After molding, the mounting ring is precision turned to a diameter on the order of +/−0.0005 inches. The recess 36 of the pole piece 14 is also precision machined to a like diameter and tolerance. This assures precise and positive alignment of the mounting ring and pole piece, which in turn insures positive and precise alignment of the suspension 40 and pole piece 14, which in turn assures precise and positive alignment of the voice coil 34 in the air gap 30.

This construction results in a loudspeaker having two major subassemblies. One of the subassemblies is the magnetic structure or circuit, including the pole piece 14, the magnetic ring 20 and the top and bottom plates 22 and 24 respectively. The other major subassembly is the diaphragm and voice coil assembly, which includes the diaphragm 18, the mounting ring 38, the lower suspension 40, the voice coil former 34, the voice coil 32 and the upper suspension 44. When loudspeakers break or malfunction, it is almost always some portion of the diaphragm and voice coil assembly which has failed. Any diaphragm and voice coil assembly which is made to the proper dimension so as to correspond to the magnetic circuit assembly can be substituted in a repair operation which is absolutely, precisely and positively self-aligning and self-centering, and which requires no adjustment whatsoever. In order to change or even merely inspect the diaphragm and voice coil assembly, all that is required is removal of the screws which hold the clamping ring 14 and the bolts 42. The entire assembly can then be lifted away from the magnetic structure. Replacement or refitting of the diaphragm voice coil assembly is simply the reverse of this procedure, except that bolts 42 must be aligned with the bores in pole piece 14. Interchangeability between diaphragm and voice coil assemblies and magnetic structures is complete and reliable. Heretofore, it has not been possible to manufacture a diaphragm and voice coil assembly as an integral unit, which could be mounted to a vented pole piece, particularly without requiring adjustment for centering.

The mounting ring 38 is preferably cut away between the bolts 42 to form channels 39, as also shown in FIG. 4, so that the inside of the voice coil may receive cooling air not only from the air channel defined by the front surface of the top plate and rear of the diaphragm, but also from under the voice coil suspension and mounting ring and through the vented pole piece. Heat generated by the voice coil is rapidly conducted out and away from the coil, reducing the possibility of voice coil warpage and greatly increasing reliability of the loudspeaker. The depth of immersion of the voice coil into the magnetic field gap may be easily altered by reducing the height of the voice coil suspension mounting ring 38, by increasing the depth of the machine recess 36, or by a combination of both. Moreover, the bias compliance linearity of the suspension may be conveniently altered by either or both of the noted adjustments during manufacture to reduce acoustic distortion.

Assembly of the moving parts of the loudspeaker is achieved with great mechanical precision by placing all of the parts that require exact concentricity, with respect to the air gap, in a suitable fixture and cementing them together with high strength and high temperature capability epoxies. These parts include: the voice coil mounting ring, the lower voice coil suspension, the voice coil former, the voice coil diaphragm and the upper voice coil suspension. The assembly cures in the fixture and becomes an integral structure. This rigidly controlled process results in a loudspeaker which is easily repaired in the field, and which requires no special adjustments. Moreover, the process results in the economical production of many such units with uniformly superior quality. It is never necessary to use adhesives, shims or other means to align and fasten the diaphragm and voice coil assembly to the magnetic structure, or to the main frame.

Figure 5A:
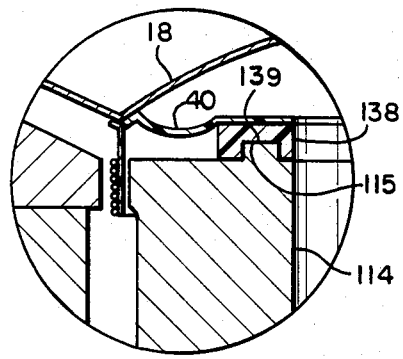
FIG. 5(a) and FIG. 5(b) are partial section views of a first alternative embodiment for positively positioning the voice coil suspension.
Figure 5B:
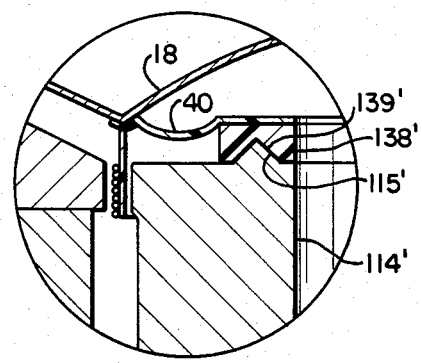

A first alternative embodiment for positively positioning and centering the mounting ring on the pole piece is illustrated in FIG. 5(a) and FIG. 5(b). In FIG. 5(a), a pole piece 114 is provided with an annular, upwardly projecting ridge 115, having a substantially rectangular cross-section. A mounting ring 138 is provided with an annular groove 139 for receiving the ridge 115. In FIG. 5(b), a pole piece 114' is provided with an annular, upwardly directed ridge 115' having a substantially triangular cross section. A mounting ring 138' is provided with an annular groove 139' also of triangular cross section.

Figure 6:
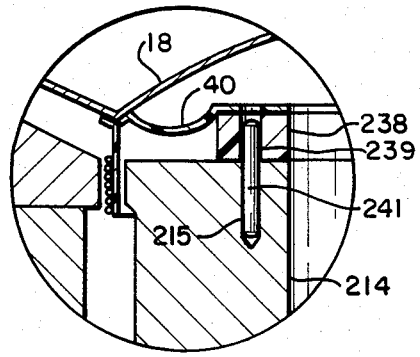
FIG. 6 is a partial section view of a second alternative embodiment for positively positioning the voice coil suspension.

A third alternative embodiment is illustrated in FIG. 6. A pole piece 214 is provided with at least two bores 215 in the upper surface thereof. A mounting ring 238 is provided with a corresponding number of bores 239. Pins 241 are inserted in the bores 215 and 239 in order to provide the interfitting structure.

Figure 7B:
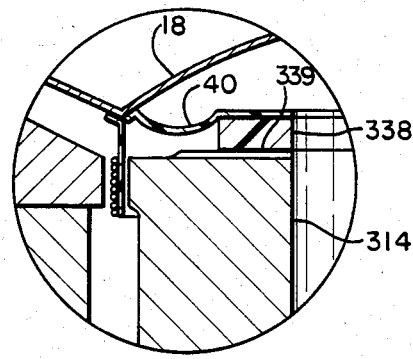
FIG. 7(b) is a partial section view of FIG. 7(a)
Figure 7A:
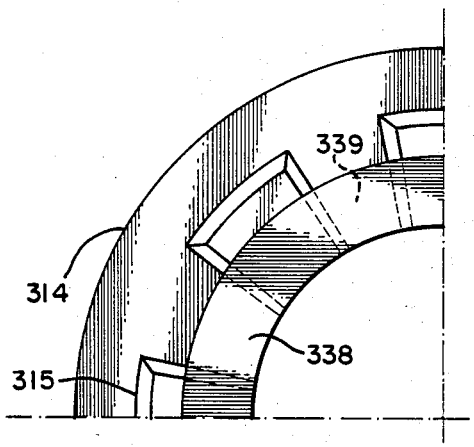
FIG. 7(a) is a partial plan view of a third alternative embodiment for positively positioning the voice coil suspension.

A third alternative embodiment is shown in FIGS. 7(a) and 7(b). A pole piece 314 is provided with a plurality of raised embossed portions 315 spaced around and projecting upwardly from the top surface of the pole piece. A mounting ring 338 is provided with a corresponding number of grooves 339, which intergage with the embossed portions 315.

Figure 8:
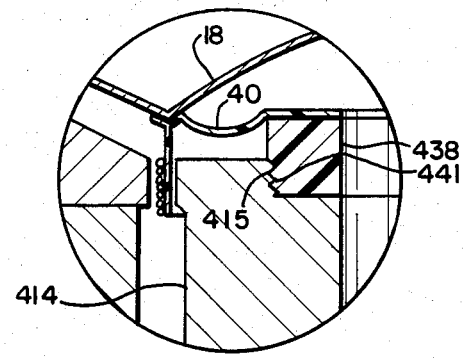
FIG. 8 is a partial section view of a fourth alternative embodiment for positively positioning the voice coil suspension.

A fourth embodiment is illustrated in FIG. 8. A pole piece 414 is provided with a threaded portion 415, which threadably engages a threaded portion 441 of a mounting ring 438.

In each of the alternative embodiments shown in FIGS. 5–8, the interfitting structure disclosed is preferably machined, turned or otherwise manufactured to the same tolerances as the embodiment shown in FIGS. 3 and 4, namely +/−0.0005 inches.

This invention may be embodied in a number of specific forms without departing from the spirit or essential attributes thereof, and accordingly, reference should be made to the appended claims, rather than to the foregoing specification, as indicating the scope of the invention.

I claim:

1. A self-centering mounting arrangement for a diaphragm and voice coil assembly in a magnetic structure having an axially vented pole piece which defines an inner boundary for an air gap in the magnetic structure, in which air gap the voice coil must be aligned, the arrangement comprising:
    a mounting ring;
    a voice coil suspension for the diaphragm and voice coil assembly projecting outwardly from the mounting ring and in axial alignment therewith; and,
    the pole piece having a concentric recess of predetermined diameter formed in the top thereof and the outer diameter of the mounting ring corresponding to the predetermined diameter, whereby the mounting ring may be received in the recess and positively held in axial alignment with the pole piece, the voice coil being thereby automatically properly positioned in the air gap.

2. The mounting arrangement of claim 1, wherein the mounting ring and the voice coil suspension are adhesively fixed to one another.

3. The mounting arrangement of claim 2, wherein the voice coil suspension and the diaphragm and voice coil assembly are adhesively fixed to one another.

4. The mounting arrangement of claim 1, wherein the mounting ring and the voice coil suspension are integrally formed.

5. The mounting arrangement of claim 1, further comprising means for attaching the diaphragm and voice coil assembly to the pole piece.

6. The mounting arrangement of claim 5, wherein attaching means comprises adhesive bonding.

7. The mounting arrangement of claim 1, wherein the mounting ring and the pole piece are threadably engaged.

8. The mounting arrangement of claim 1, wherein the diaphragm and voice coil assembly are manufactured as an integral unit.

9. A method for mounting a diaphragm and voice coil assembly in a magnetic structure have an axially vented pole piece which defines an inner boundary for an air gap in the magnetic structure, in which air gap the voice coil must be aligned, comprising the steps of:
    forming a mounting ring with a voice coil suspension for the diaphragm and voice coil assembly projecting outwardly from the mounting ring and in axial alignment therewith;
    providing interfitting structure partly on the mounting ring and partly on the pole piece for automatically properly positioning the voice coil in the air gap when the mounting ring and the pole piece are interfitted; and,
    attaching the diaphragm and voice coil assembly to the pole piece with means including electrically conductive members for carrying current to and from the voice coil.

10. The method of claim 9, comprising the step of adhesively bonding the mounting ring and the voice coil suspension to one another.

11. The method of claim 10, comprising the step of adhesively bonding the voice coil suspension and the diaphragm and voice coil assembly to one another.

12. The method of claim 9, comprising the step of integrally forming the mounting ring and the voice coil suspension.

13. The method of claim 9, comprising the step of forming the diaphragm and voice coil assembly as an integral unit.

14. A method for mounting a diaphragm and voice coil assembly in a magnetic structure having an axially vented pole piece which defines an inner boundary for an air gap in the magnetic structure, in which air gap the voice coil must be aligned, comprising the steps of:
- forming a mounting ring with a voice coil suspension for the diaphragm and voice coil assembly projecting outwardly from the mounting ring and in axial alignment therewith;
- removing portions of the mounting ring to form additional air channels for cooling; and,
- providing interfitting structure partly on the mounting ring and partly on the pole piece, whereby the voice coil will be automatically properly positioned in the air gap when the mounting ring and the pole piece are interfitted.

15. A self-centering mounting arrangement for a diaphragm and voice coil assembly in a magnetic structure having an axially vented pole piece which defines an inner boundary for an air gap in the magnetic structure, in which air gap the voice coil must be aligned, the arrangement comprising:
- a mounting ring;
- a voice coil suspension for the diaphragm and voice coil assembly projecting outwardly from the mounting ring and in axial alignment therewith;
- means for attaching the diaphragm and voice coil assembly to the pole piece, the attaching means including electrically conductive members for carrying current to and from the voice coil; and,
- interfitting structure disposed partly on the mounting ring and partly on the pole piece, whereby the voice coil will be automatically properly positioned in the air gap.

16. The mounting arrangement of claim 15, wherein the attaching means comprises electrically conductive bolts.

17. The mounting arrangement of claim 15, wherein the mounting ring and the voice coil suspension are adhesively fixed to one another.

18. The mounting arrangement of claim 17, wherein the voice coil suspension and the diaphragm and voice coil assembly are adhesively fixed to one another.

19. The mounting arrangement of claim 15, wherein the mounting ring and the voice coil suspension are integrally formed.

20. The mounting arrangement of claim 15, wherein the diaphragm and voice coil assembly are manufactured as an integral unit.

21. A self-centering mounting arrangement for a diaphragm and voice coil assembly in a magnetic structure having an axially vented pole piece which defines an inner boundary for an air gap in the magnetic structure, in which air gap the voice coil must be aligned, the arrangement comprising:
- a mounting ring having cut-away portions therein forming channels for additional air cooling;
- a voice coil suspension for the diaphragm and voice coil assembly projecting outwardly from the mounting ring and in axial alignment therewith; and,
- interfitting structure disposed partly on the mounting ring and partly on the pole piece, whereby the voice coil will be automatically properly positioned in the air gap.

22. A self-centering mounting arrangement for a diaphragm and voice coil assembly in a magnetic structure having an axially vented pole piece which defines an inner boundary for an air gap in the magnetic structure, in which air gap the voice coil must aligned, the arrangement comprising:
- a mounting ring;
- a voice coil suspension for the diaphragm and voice coil assembly projecting outwardly from the mounting ring and in axial alignment therewith; and,
- the pole piece having a ridge on the upper surface and the mounting ring having a corresponding groove on a lower surface, the ridge and the groove forming interfitting structure for positively positioning the mounting ring in axial alignment with the pole piece, the voice coil being thereby automatically properly positioned in the air gap.

23. A self-centering mounting arrangement for a diaphragm and voice coil assembly in a magnetic structure having an axially vented pole piece which defines an inner boundary for an air gap in the magnetic structure, in which air gap the voice coil must aligned, the arrangement comprising:
- a mounting ring;
- a voice coil suspension for the diaphragm and voice coil assembly projecting outwardly from the mounting ring and in axial alignment therewith; and,
- interfitting structure disposed partly on the mounting ring and partly on the pole piece formed by projecting pins and receiving sockets, whereby the voice coil will be automatically properly positioned in the air gap.

* * * * *